United States Patent [19]

Freudenberg

[11] Patent Number: 4,688,847
[45] Date of Patent: Aug. 25, 1987

[54] VEHICLE WINDOW INSTALLATION

[75] Inventor: Steffen Freudenberg, Ingolstadt, Fed. Rep. of Germany

[73] Assignee: Audi AG., Ingolstadt, Fed. Rep. of Germany

[21] Appl. No.: 893,317

[22] PCT Filed: Sep. 25, 1985

[86] PCT No.: PCT/EP85/00497
§ 371 Date: Jul. 2, 1986
§ 102(e) Date: Jul. 2, 1986

[87] PCT Pub. No.: WO86/02602
PCT Pub. Date: May 9, 1986

[30] Foreign Application Priority Data

Nov. 2, 1984 [DE] Fed. Rep. of Germany ....... 3439997

[51] Int. Cl.$^4$ .............................................. B60J 1/10
[52] U.S. Cl. ...................................... 296/146; 49/428; 49/440

[58] Field of Search ................. 296/146, 201; 49/428, 49/440, 375

[56] References Cited

FOREIGN PATENT DOCUMENTS

| 2327904 | 5/1977 | France . |
|---------|--------|----------|
| 20512 | 2/1983 | Japan . |
| 20513 | 2/1983 | Japan . |
| 40274 | 9/1983 | Japan . |

Primary Examiner—Robert R. Song
Attorney, Agent, or Firm—Karl Hormann

[57] ABSTRACT

A frame (9) guiding the rear marginal portion of a first window pane (13) received in a door (7) is widened to overlap the exterior of a second pane (17) which abuts the first pane (13) guided in the frame (9). The second pane may comprise a pane (17) received in a second door (15), or it may comprise a fixedly mounted pane.

13 Claims, 3 Drawing Figures

VEHICLE WINDOW INSTALLATION

The invention relates to an automotive vehicle having at least two side windows, at least one of the panes being arranged in a door and wherein the door comprises a frame which receives the pane together with its rear marginal portion for longitudinal movement along a substantially vertical guide track.

In known arrangements a substantially vertical gap is present within the area of the window, between the window frame and an adjacent structural member which also supports a pane. Four door vehicles comprising a center body pillar which forms part of the exterior shell of the vehicle even have two gaps. These gaps require very precise positioning of the structural members relative to each other, and often they are the cause of noise at higher speeds. Known solutions by and large provide for wide structures thus impeding visibility in this area.

The invention is based upon the task of avoiding the formation of gaps within the window area, with simple means.

The task is accomplished by the characterizing features of claim 1.

By structuring the frame which supports the first pane in such a manner that it extends to the second pane and overlaps an outer portion thereof, the formation of open gaps is avoided. In this manner the often annoying hissing and whistling noises generated at higher speeds are prevents by eliminating their cause, rather than by attempting to improve the noise by additional means (e.g. gaskets). By covering all vertical glass edges time-consuming adjustments in tolerances become unnecessary.

The invention may advantageously be employed in the area of a window at the transition between the front door and a rear side door, at the transition between a rear side door and an adjacent rigidly mounted third side window, or in the case of two-door vehicles, at the transition between the driver's door, or passenger's door, and a fixed or movable second side window.

The invention may be employed for windows in many different frames, even though certain embodiments—as pointed out in the subclaims—are preferred. Thus it is possible to utilize conventional frames, i.e. U-shaped profiles, as well as frames arranged on the rear surface of the panes in which the panes are guided by means of slide members. Combinations of both kinds of frames are equally useful, as is the use of a frame guiding the pane at its rear edge outside of the body of the frame. Such a window guide, in which the invention may be utilized with particular advantage has been shown in U.S. Pat. No. 3,703,053.

Advantageously the frame covers an outer portion of a body pillar arranged between the windows, thus providing for an enlarged window surface as well as a good seal.

It is particularly advanateous to provide the frame at it inner surface with a covering which affects a marginal portion of the second window when the door is closed. This would provide for a guide for the second pane, in case it is recessable. More particularly, the covering would prevent lifting off of the pane at high speeds and dampens vibrations of the pane. In case the second window is fixed, such covering may essentially serve as a seal.

In vehicles comprising two doors at each side, and a body pillar between them, it is especially advantageous to guide the second pane mounted in the rear door at its rear edge only and to arrange the forward edge between gasket members at the frame between the forward door and the body pillar. The two gaskets provide for a true guide for the second pane without requiring a separate frame or a guide rail.

Claim 5 characterized an advantageous embodiment of the frame relative to the guiding of the first pane.

An embodiment of the invention has been depicted in the drawing and will hereafter be described more fully.

FIG. 1 schematically depicts a forward and a rear door of a passenger car,

Figure 1:
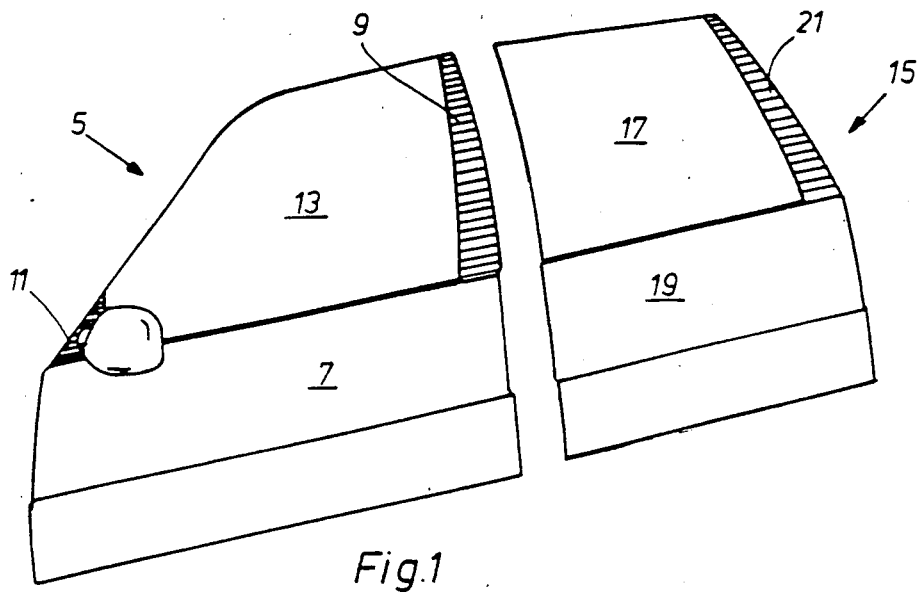

A passenger car forward door 5 as shown in FIG. 1 comprises a door body portion 7 with a substantially vertical frame 9 and a triangular bracket 11 for mounting a mirror protruding therefrom. A movable or recessable window pane 13 is, outside of body 7, guided only by the frame 9 and by the bracket 11. The regulator mechanism for raising and lowering the window out of and into the door, between inner and outer panels thereof, as well as guide means for guiding the window within the door, have not been shown as they are entirely conventional and form no part of the instant invention.

A rear door 15 is of similar construction as regards the mounting of its window pane 17, that is to say the window pane outside of the body portion 19 of the door is guided only in a frame 21.

Figure 2:
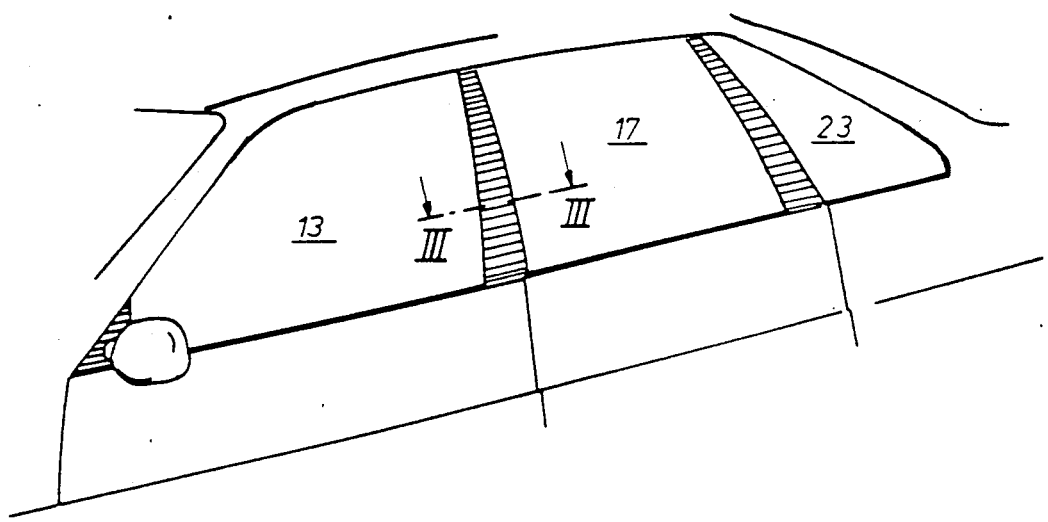
FIG. 2 depicts the doors of FIG. 1 as mounted into a vehicle.

FIG. 2 depicts the doors 5 and 15 as mounted into a passenger car. The doors are monted on hinges (not shown) and are provided with locks (also not shown) in a well-known manner which is believed not to require further elucidation. As may be seen from the figure, a triangular pane 23 substantially abuts the pane 17 of the rear door 15, within the window section, i.e. above the so-called belt line of the vehicle. Unlike the panes 13 and 17 the pane 23 cannot be raised or lowered and is afixed to the body by adhesion.

Figure 3:
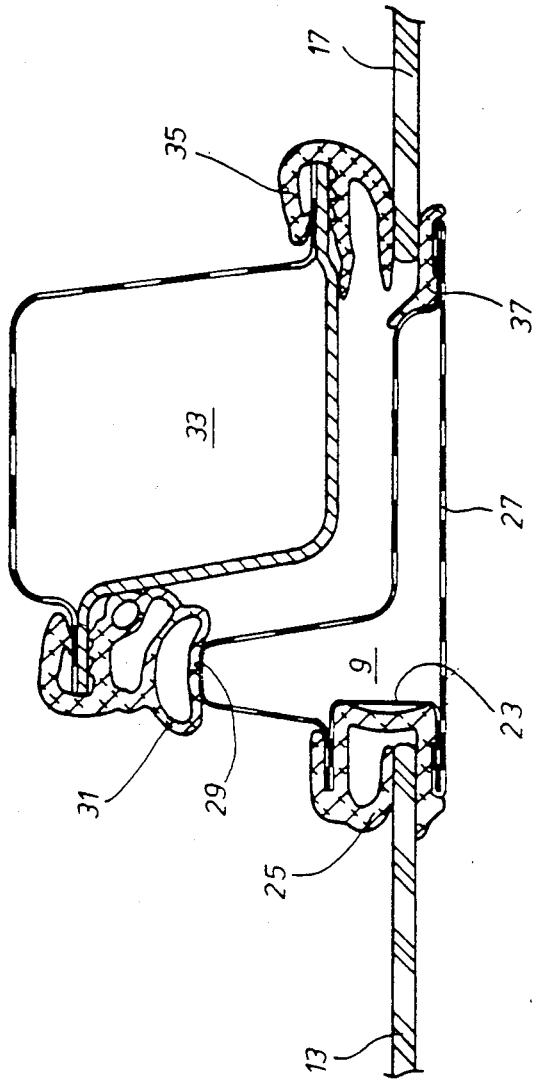
FIG. 3 is a sectional view along line III—III of FIG. 2.

The frame 9 of the forward door 5 shown in cross-section in FIG. 3 is made of sheet metal and comprises a U-shaped section 23 which is provided with a gasket 25 for receiving the window pane 13. The gasket 25 in connection with the U-shaped section 23 is formed in such a manner that the window pane 13 extends as flush as possible relative to the outer surface 27 of the frame 9.

When the door 7 is in its closed position a surface 29 of the frame 9 engages a gasket 31 fitted to a center pillar 33 of the chassis of the vehicle. Toward the outside the center pillar 33 is substantially covered by the frame 9. On its side opposite the gasket 31 the center pillar 33 is provided with a further gasket 35 which is engaged by the interior surface of the window pane 17 when the door 19 is in its closed position. A marginal portion of the exterior surface of the window pane 17, is supported by the frame 9 provided with a lining 37. The gasket 35 and the lining 37 form a guide for the rear window pane 17 when the forward door 7 is in its closed position. As will be appreciated by those skilled in the art, the gaskets 25, 31, and 35 as well as the lining 37 are preferably of resilient material of the kind well known in this art, such as rubber, felt, or the like.

I claim:

1. A window arrangement for use in an automotive vehicle, comprising:

a first window pane comprising inner and outer surfaces mounted for substantially vertical movement in a door of said vehicle;

a second window pane comprising inner and outer surfaces mounted in side by side relationship with said first window pane;

pillar means mounted in said vehicle and extending vertically adjacent said inner surfaces of said first and second window panes intermediate thereof; and frame means mounted on said door in substantially overlying relationship relative to said pillar means and comprising substantially vertically extending first and second marginal portions, one of said vertically extending portions comprising rail means for slideably receiving a vertical marginal section of said first window pane, the other of said vertically extending portions comprising means for extending over and engaging a vertical marginal section of the outer surface of said second window pane.

2. The window arrangement in accordance with claim 1, characterized by the fact that the other of said vertically extending portions of said frame means at its surface extending over said vertical marginal section of said outer surface of said second window pane is provided with a covering which engages said marginal outer surface area of said second window pane in the closed position of said door.

3. The window arrangement of claim 2 for use in an automotive vehicle comprising at each side two doors and pillar means arranged intermediate thereof, characterized by the fact that said second window pane is mounted in the rear one of said two doors and is guided outside of said rear door only along its rear margin and that its forward margin is received between gaskets respectively provided on said frame means of the forward one of said two doors and said pillar means.

4. The window arrangement in accordance with claim 3, characterized by the fact that said one of said vertically extending portions of said frame means comprises a U-shaped portion for guiding said marginal section of said first window pane.

5. An apparatus for mounting a plurality of window panes in side by side relationship, comprising:

a first window pane comprising at least one substantially vertical straight marginal portion and mounted for substantially vertical movement, a second window pane mounted adjacent said straight marginal portion, and frame means extending between said straight marginal portion and said second window pane, said frame means comprising a channel member for slideably engaging said straight marginal portion and a flat portion for overlapping and engaging a first marginal surface area of said second window pane.

6. The apparatus of claim 5, wherein said first pane is mounted in a door and said frame means is fixedly mounted on said door.

7. The apparatus of claim 6, wherein said channel member is of substantially U-shaped cross-section.

8. The apparatus of claim 7, wherein said channel member is lined with gasket means.

9. The apparatus of claim 8, wherein said flat portion is provided with a lining.

10. The apparatus of claim 9, wherein an elongated pillar means is provided intermediate said first and second panes in substantially parallel relationship with said straight marginal portion and wherein said extending means extends transversally of said pillar means.

11. The apparatus of claim 10, wherein said pillar means comprises gasket means and wherein said extending means comprises a portion for engaging said gasket means.

12. The apparatus of claim 11, wherein said pillar means comprises a further gasket for engaging said second pane at a marginal area opposite said first marginal area.

13. The apparatus of claim 12, wherein said first and second panes are substantially coplanarly mounted.

* * * * *